3,766,244
Patented Oct. 16, 1973

3,766,244
N-(SUBSTITUTED-PHENYL) - ω-AMINO-ALKAN (THIO)OATE, -ALKEN(THIO)OATE AND -ALKYN(THIO)OATE COMPOUNDS
Thomas J. Giacobbe and Fred Y. Edamura, Midland, Mich., assignors to The Dow Chemical Company, Midland, Mich.
No Drawing. Filed Nov. 1, 1971, Ser. No. 194,531
Int. Cl. C07c 101/44
U.S. Cl. 260—471 A       2 Claims

ABSTRACT OF THE DISCLOSURE

Compounds useful as herbicides and insecticides defined as N-(substituted-phenyl) - ω - amino-alkan(thio)oate, -alken(thio)oate and -alkyn(thio)oate compounds.

SUMMARY OF THE INVENTION

This invention relates to new chemical compositions of matter and more particularly to new compounds of the formula:

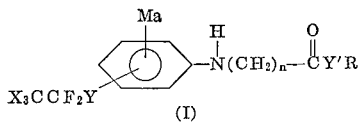

(I)

and the hydrohalide salts thereof, wherein each X independently represents hydrogen, bromo, chloro or fluoro, with the proviso that at least one X is always bromo, chloro or fluoro;
Y and Y' each independently represents oxygen or sulfur;
each M independently represents bromo, chloro, fluoro, iodo, nitro or lower alkyl containing from 1 to 4 carbon atoms, inclusive;
$a$ represents an integer of from 0 to 3, inclusive;
$n$ represents an integer of from 1 to 4, inclusive;
R represents hydrogen, lower alkyl of from 1 to 4 carbon atoms, lower alkenyl of from 3 to 6 carbon atoms or lower alkynyl of from 3 to 6 carbon atoms.

As used in the present specification and claims the terms "lower alkyl" means saturated, monovalent aliphatic radicals, including straight and branched-chain radicals of from 1 to 4 carbon atoms, as illustrated by methyl, ethyl, propyl, isopropyl, butyl, sec.-butyl, tert.-butyl and the like. The term "halide" as used herein means chloro or bromo.

The term "alkenyl" as used in the present specification and claims means unsaturated, aliphatic radicals including straight and branched-chain radicals of from 3 to 6 carbon atoms as illustrated by, but not limited to, propenyl, butenyl, pentenyl, hexenyl and the like.

The term "alkynyl" as used in the present specification and claims means unsaturated, aliphatic radicals, including straight and branched-chain radicals of from 3 to about 6 carbon atoms, as illustrated by, but not limited to propynyl, butynyl, pentynyl, hexynyl, and the like.

The products of the present invention are usually liquids or crystalline solids at room temperature which are of varying degrees of solubility in many common organic solvents and of low solubility in the water. The novel compounds disclosed are suitable for use as herbicides and insecticides.

The subject compounds (I) of the present invention are generally prepared by reacting an appropriately substituted reactive alkan-, alken- or alkyn(thio)oate compound of the formula:

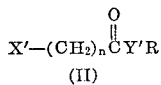

(II)

with a selected substituted aniline hydrochloride compound of the formula:

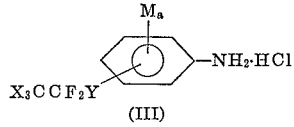

(III)

wherein X, M, $a$, $n$, Y, Y' and R are as previously defined, and X' is bromo or chloro. The reaction is ordinarily carried out in a suitable inert organic solvent, such as, for example, dichloromethane, toluene, benzene, and the like. In order to decrease reaction time, a small amount of an actuating agent, e.g., triethylamine, pyridine, and the like, can be incorporated into the reaction mixture. In the present invention, the employment of an actuating agent is preferred.

The reaction takes place smoothly at temperatures of from 0 to about 120° C.; generally, the reaction is carried out at the boiling point of the reaction mixture under reflux conditions and under an inert atmosphere, such as, for example, nitrogen, and the like. The amount of the reactants employed is not critical and essentially equimolar proportions of the reactants are usually employed. A slight equimolar excess of the actuating agent is usually preferred. The pressure employed is not critical and the reaction is ordinarly conducted at ambient atmospheric pressure.

In carrying out the reaction, the aniline reactant (III) is mixed with an inert organic solvent as described and the actuatitng agent added thereto. The resulting mixture is placed in a flask, stoppered, and maintained at ambient temperature for a period of from about 1 to about 4 hours. The inert organic solvent is removed by evaporation under reduced pressure and the residue obtained mixed with an appropriate organic solvent, such as, for example, benzene, carbon tetrachloride and the like, and filtered to remove any remaining undissolved material. Concentration of the filtrate by evaporation under pressure yields an oily residue containing the aniline reactant which is dissolved in a solvent such as acetonitrile, acetone, and the like. The substituted acetate reactant (II) is added to the solution containing the aniline reactant and the resulting mixture heated under an atmosphere of nitrogen gas at reflux temperatures for a period of from about 14 to 24 hours in order to assure substantial completion of the reaction.

Following the completion of the reaction, the carrier medium is removed by evaporation under reduced pressure and the residue obtained distilled. If the hydrohalide salt of the so recovered product of the invention is desired, the distillate product obtained is dissolved in a solvent, such as hereinbefore mentioned, and hydrogen chloride or hydrogen bromide gas is bubbled through the solution to form the desired hydrohalide salt. In some instances, a small amount of hexane is added to induce crystallization of the salt from the solution. If a highly purified product is required, the product thus obtained can be recrystallized from a suitable solvent.

The desirable properties of the products of the instant invention are inherent in the compounds as obtained from the reaction mixture; when highly selective properties are to be relied upon, the purified compounds will be preferred. However, for many applications, wherein low cost is a major consideration, incompletely purified products can be used when desired.

DESCRIPTION OF THE PREFERRED EMBODIMENTS

The following examples are presented to illustrate preparation of typical compounds of the invention but the scope of the invention is not to be considered limited to the specific examples given.

Example 1

3-(2,2 - dichloro - 1,1 - difluoroethoxy)aniline hydrochloride (about 5.75 grams; 0.02 mole) was mixed with dichloromethane (50 milliliters) and triethylamine (about 2.4 milliliters; 0.02 mole) added thereto. The flask containing the resulting mixture was stoppered and allowed to stand at ambient temperature for a period of about 2 hours after which the dichloromethane solvent was removed by evaporation under reduced pressure. The aniline residue obtained was mixed with carbon tetrachloride (50 milliliters) and the resulting solution filtered to remove any undissolved material. The filtrate was concentrated by evaporation under reduced pressure and the resulting residual oil representing the aniline reactant dissolved in acetonitrile (100 milliliters).

Ethyl bromoacetate (3.98 grams; 0.02 mole) was added to the aniline-containing solution and the resulting reaction mixture was heated at reflux temperatures under an atmosphere of nitrogen gas for a period of about 18 hours. Following the completion of the reaction, the acetonitrile solvent was removed by evaporation under reduced pressure and the residue obtained was distilled. The distillate portion boiling at 143–150° C. (at 0.3 mm. Hg) and representing the desired product was collected and mixed with 10 milliliters of carbon tetrachloride. Hydrogen chloride gas was bubbled through the solution and, upon the addition of a small amount of hexane to the solution, a precipitate representing the hydrochloride salt of the desired product was obtained. Following filtration, the collected crystals were recrystallized by dissolution in chloroform (a few drops of ethanol were added to effect complete dissolution of the crystals) and precipitated therefrom by the addition of a sufficient amount of hexane. As a result of these operations, the desired ethyl 3-(2,2-dichloro-1,1 - difluoroethoxy)phenylamino)acetate hydrochloride product was obtained as a white crystalline solid melting at 133.5–137.5° C.

Additional compounds within the scope of the present invention can be prepared by the procedures detailed in the foregoing example. In the following examples are presented the essential starting materials required to prepare the indicated named compound by the procedures heretofore described. The corresponding hydrohalide salts of the products hereinafter set forth can be prepared if desired according to the procedures previously described.

S-butyl 3-(4-chloro - 2 - (2,2 - dibromo - 1,1 - difluoroethylthio)phenylamino)thiopropionate by the reaction of 4-chloro-2-(2,2-dibromo - 1,1 - difluoroethylthio)aniline hydrochloride and S-butyl 3-bromothiopropionate.

Methyl 5 - (2-pentafluoroethoxy)-4-iodo-phenylamino) valerate by the reaction of 4 - bromo - 2 - (pentafluoroethoxy)-4-iodaniline hydrochloride and methyl 5-bromovalerate.

2-propenyl 2 - (4,6 - dibromo - 2 - (2,2,2-trichloro-1,1-difluoroethylthio)phenylamino)acetate by the reaction of 4,6 - dibromo - 2 - (2,2,2 - trichloro - 1,1 - difluoroethylthio)aniline hydrochloride and 2-propenyl bromoacetate.

3 - hexenyl 4 - (2 - (2,2 - dichloro - 1,1 - difluoroethoxy)-4-nitro - 6 - n - propylphenylamino)butyrate by the reaction of 2 - (2,2 - dichloro - 1,1 - difluoroethoxy)- 4 - nitro - 6-n-propylaniline hydrochloride and 3-hexenyl 4-bromobutyrate.

2 - propynyl 2-(6-chloro-2-(2-bromo-2-chloro-1,1-difluoroethylthio) 4 - methylphenylamino)acetate by the reaction of 6-chloro-2-(2-bromo-2-chloro-1,1-difluoroethylthio) - 4 - methylaniline hydrochloride and 2-propynyl bromoacetate.

S - 3 - hexynyl 5 - (2 - (2,2 - dichloro - 1,1 - difluoroethoxy) - 4 - tert. - butylphenylamino)thiovalerate by the reaction of 2 - (2,2 - dichloro - 1,1 - difluoroethoxy)-4-tert. - butylaniline hydrochloride and S - 3 - hexynyl 5-bromo-thiovalerate.

S - butyl 5 - (2 - (2,2,2 - tribromo - 1,1 - difluoroethoxy) - 4 - fluorophenylamino)thiovalerate by the reaction of 2 - (2,2,2 - tribromo - 1,1 - difluoroethoxy)-4- fluoroaniline hydrochloride and S-butyl 5-bromothiovalerate.

3-hexenyl 5 - ( 3,4,6 -trichloro-2-(pentafluoroethoxy)- phenylamino)valerate by the reaction of 3,4,6-trichloro- 2-(pentafluoroethoxy)aniline hydrochloride and 3-hexenyl 5-bromovalerate.

S-2-butyl 2 - (4,6-dibromo-3-(2,2-dichloro-1,1-difluoroethoxy)phenylamino)thioacetate by the reaction of 4,6- dibromo-3-(2,2 - dichloro-1,1-difluoroethoxy)aniline hydrochloride and S-2-butynyl bromothioacetate.

S-ethyl 2 - (4-chloro-3-(pentafluoroethylthio)-6-nitrophenylamino)thioacetate by the reaction of 4-chloro-3- (pentafluoroethylthio)-6-nitroaniline hydrochloride and S-ethyl bromothioacetate.

2-propenyl 3-(3-(2-bromo-2-chloro-1,1-difluoroethoxy)- 4,6-diethylphenylamino)propionate by the reaction of 3- (2 - bromo-2-chloro-1,1-difluoroethoxy)-4,6-diethylaniline hydrochloride and 2-propenyl 3-bromopropionate.

S-ethyl 2-(2-(2,2,2-tribromo-1,1-difluoroethoxy)-3,4,6- tri-isopropylphenylamino)thioacetate by the reaction of 2-(2,2,2-tribromo - 1,1 - difluoroethoxy)-3,4,6-tri-isopropylaniline hydrochloride and S-ethyl bromothioacetate.

2-butenyl 2 - (4-(pentafluoroethylthio)-2,6-dinitrophenylamino)acetate by the reaction of 4-(pentafluoroethylthio) - 2,6 - dinitroaniline hydrochloride and 2-butenyl bromoacetate.

Ethyl 3 - (4 - (2,2-dichloro-1,1-difluoroethoxy)-2,6-ditert.-butylphenylamino)propionate by the reaction of 4- (2,2 - dichloro - 1,1 - difluoroethoxy)-2,6-di-tert.-butylaniline hydrochloride and ethyl 3-bromopropionate.

S-3-butynyl 2-(3-(2,2 - dibromo-1,1-difluoroethylthio)- 2,4,6-trinitrophenylamino)thioacetate by the reaction of 3 - (2,2 - dibromo-1,1-difluoroethylthio)-2,4,6-trinitroanilinehydrochloride and S-3-butynyl bromothioacetate.

Methyl 3-(2-chloro-3-(2,2-dichloro-1,1-difluoroethoxy)- 4-tert.-butyl-6-nitrophenylamino)propionate by the reaction of 3 - chloro-3-(2,2-dichloro-1,1-difluoroethoxy)-4- tert.-butyl-6-nitroaniline hydrochloride and methyl 3- bromopropionate.

S-2-propenyl 3-(4-(2,2-dibromo-1,1-difluoroethylthio)- 2,6-difluorophenylamino)thiopropionate by the reaction of 4 - (2,2-dibromo-1,1-difluoroethylthio)-2,6-difluoroaniline hydrochloride and S-2-propenyl 3-bromothiopropionate.

3-butenyl 5-(2-chloro-4-(2-bromo-2-chloro-1,1-difluoroethoxy)-3-methyl-6-nitrophenylamino)valerate by the reaction of 2 - chloro-4-(2-bromo-2-chloro-1,1-difluoroethoxy)-3-methyl-6-nitroaniline hydrochloride and 3-butenyl 5-bromovalerate.

Methyl 5 - (2 - bromo - 4 - (2,2-dichloro-1,1-difluoroethoxy)-6-tert.-butylphenylamino)valerate by the reaction of 2 - bromo-4-(2,2-dichloro-1,1-difluoroethoxy)-6- tert.-butylaniline hydrochloride and methyl 5-bromovalerate.

The products of the present invention are suitable for uses as herbicides and insecticides. For such uses, the unmodified substance can be utilized. However, the present invention also embraces the use of compounds in a formulation. Thus, for example, a compound can be dispersed on a finely-divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the additions of wetting, dispersing, or emulsifying agents.

It is to be understood, however, that all of the compounds claimed and compositions containing them may not be equally effective at similar concentrations or against the same plants or insects. The exact concentration of the toxic substituent to be employed in the treating compositions is not critical and may vary considerably provided the plant or insect and/or their respective habitats are contacted with an effective amount of the toxicant. The concentration of the toxicants in liquid compositions generally is from about 1.0 to about 50 or more percent by weight. Concentrations up to about 95 weight percent are, however, often employed. In dusts or dry formulations, the concentration of the toxicant can be from about 1.0 to about 10 weight percent although concentrations of up to about 95 weight percent are often conveniently employed, in compositions to be employed as concentrates, the toxicant can be present in a concentration of from about 5 to about 98 weight percent.

The compounds of this invention also can be applied admixed with other chemicals which are used in agronomic and horticultural management and are compatible with the compounds of this invention. Such chemicals can be, but are not restricted to, the classes of chemicals commonly known as plant nutrients, fertilizers, insecticides, fungicides, herbicides and nematocides.

Each of the compounds of the present invention, the utility of which is not specifically recited hereinafter, has the ability to inhibit or otherwise control one or more of the above said or other insect or weed pests when applied at dosage levels of from about 10 to about 10,000 or more parts per million by weight.

In representative operations, ethyl 3-((2,2-dichloro-1,1-difluoroethoxy)phenylamino)acetate hydrochloride gives complete or substantially complete control of pigweed and wild mustard-charlock when the seeds of such plants are contacted with compositions containing the above-named compound at a rate sufficient to give 20 pounds of the active agent per acre.

In additional representative operations, the ethyl 3-((2,2 - dichloro-1,1-difluoroethoxy)phenylamino)-acetate hydrochloride compound gives substantially complete control of adult yellow fever mosquitoes when such insects are contacted with compositions containing the above-named compound at a concentration of 10 parts per million by weight.

The aniline reactants (III) employed in the present invention can be prepared by reacting known substituted aminothiophenol or nitrophenol compounds with known compounds of the formula $X_2C=CF_2$, wherein X is hydrogen, bromo or chloro and at least one X is bromo or chloro, according to known or analogous procedures described in the literature. See, for example, J. Lichtenberger and A. M. Geyer, Bull. Soc. Chim. France, 4, pp. 581–592 (1957) and William A. Sheppard, Journal of Organic Chemistry, vol. 29, #1, pp. 1–15 (1964). Aniline reactants of Formula III are also described by O. Scherer and G. Hörlein in Republic of South Africa patent application 691,009, January 1969.

The $CX_2HCF_2Y$— moiety of the resulting substituted amino or nitro compounds can readily be converted to the $CX_3CF_2Y$— moiety of the present invention, wherein X and Y are as defined hereinbefore, by further photochemical halogenation reactions known to those skilled in the art with appropriate halogenating agents such as, for example, $Cl_2$, ClBr and the like. Compounds wherein X is further fluorinated are obtained by selectively reacting compounds wherein X is bromo or chloro with molten antimony fluorochloro compounds according to known procedures at temperatures of from about 80 to about 120° C. for a period of from about ½ to about 2 hours.

The nitrophenol starting materials bearing the $$CX_3CF_2Y—$$

moiety are readily reduced to the corresponding desired anilines with various reducing agents, such as, for example, zinc-hydrochloric acid, hydrogen-Raney nickel, and the like.

The compounds corresponding to Formula II employed as starting materials in the present invention are readily prepared according to known or analogous methods described in the literature and many are available commercially.

We claim:
1. Substituted carbanilate compounds corresponding to the formula:

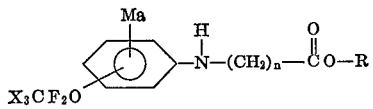

and their hydrohalide salts, wherein
each X independently represents hydrogen, bromo, chloro or fluoro, with the proviso that at least one X is always bromo, chloro or fluoro;
Each M independently represents bromo, chloro, fluoro, iodo, nitro or lower alkyl containing from 1 to 4 carbon atoms, inclusive;
$a$ represents an integer of from 0 to 3, inclusive;
$n$ represents an integer of from 1 to 4, inclusive;
R represents hydrogen, lower alkyl of from 1 to 4 carbon atoms, lower alkenyl of from 3 to 6 carbon atoms or lower alkynyl of from 3 to 6 carbon atoms.

2. A compound according to claim 1 which is ethyl 3-((2,2 - dichloro - 1,1 - difluoroethoxy)phenylamino)acetate hydrochloride.

References Cited
UNITED STATES PATENTS 3,609,177  9/1971  Traber et al. _____ 260—471 C LORRAINE A. WEINBERGER, Primary Examiner L. A. THAXTON, Assistant Examiner U.S. Cl. X.R.

71—100, 111, 115; 260—455 R, 470, 516, 519; 424—301, 309, 319

PO-1050
(5/69)

UNITED STATES PATENT OFFICE
CERTIFICATE OF CORRECTION

Patent No. 3,766,244                    Dated October 16, 1973

Inventor(s) Thomas J. Giacobbe and Fred Y. Edamura

It is certified that error appears in the above-identified patent and that said Letters Patent are hereby corrected as shown below:

Column 1, line 62, after "solubility in" delete "the".

Column 2, line 30, "actuatitng" should be ---actuating---.

Column 2, line 38, after "under" should be inserted the missing word "reduced".

Column 3, line 4, "2.4 milliliters" should read ---2.46 milliliters---.

Column 3, line 34, at the end of the line, "3-(2,2-" should read ---3-((2,2- ---.

Column 3, line 50, "(2-pentafluoroethoxy)" should read ---(-2-(pentafluoroethoxy)---.

Column 3, line 52, "ethoxy)-4-iodaniline" should read ---ethoxy)-4-iodoaniline---.

Column 4, line 36, "3-chloro-3-(2,2-dichloro-1,1-difluoroethoxy)-" should read ---2-chloro-3-(2,2-dichloro-1,1--difluoroethoxy)- ---.

Signed and sealed this 17th day of September 1974.

(SEAL)
Attest:

McCOY M. GIBSON JR.
Attesting Officer

C. MARSHALL DANN
Commissioner of Patents